United States Patent [19]

Horiuchi

[11] Patent Number: 4,592,550
[45] Date of Patent: Jun. 3, 1986

[54] TENNIS BALLS AND CORE THEREFOR

[75] Inventor: Kuniyasu Horiuchi, Kobe, Japan

[73] Assignee: Sumitomo Rubber Industries, Inc., Kobe, Japan

[21] Appl. No.: 609,338

[22] Filed: May 11, 1984

[30] Foreign Application Priority Data

Nov. 15, 1983 [JP] Japan ................................ 58-215653

[51] Int. Cl.$^4$ .............................................. A63B 39/00
[52] U.S. Cl. ............................ 273/61 C; 260/998.14; 524/908; 525/236
[58] Field of Search .................... 524/908; 260/998.14; 273/61 C, 61 R; 525/236

[56] References Cited

U.S. PATENT DOCUMENTS 4,145,045 3/1979 Pockington ....................... 273/61 C
4,306,719 12/1981 Haines et al. .................. 260/998.14
4,468,496 8/1984 Takeuchi et al. ................... 525/236

Primary Examiner—Allan M. Lieberman
Attorney, Agent, or Firm—Birch, Stewart, Kolasch, Birch

[57] ABSTRACT

An object of the present invention is to obtain a tennis ball and a core for tennis ball which keeps high values within the ITF standard and besides has excellent durability.

That is, the present invention provides a core for tennis ball obtained by vulcanizing a rubber composition containing, in its whole rubber component, 5 to 40 weight % of a 1,2-bond containing polybutadiene and 60 to 95 weight % of a natural rubber and/or high cis-polybutadiene containing not less than 90% of a cis 1,4-bond, and tennis balls obtained therefrom.

3 Claims, No Drawings

TENNIS BALLS AND CORE THEREFOR

BACKGROUND OF THE INVENTION

Generally, there are two types of tennis balls, a pressurized type and a non-pressurized type. The former is produced from cores made of natural or synthetic rubbers, and its core is filled with air or a gas of 0.6 to 0.9 kg/cm$^2$ higher than atmospheric pressure. The latter is also produced from cores made of natural or synthetic rubbers, and its core is filled with air at atmospheric pressure.

The above pressurized type tennis ball is generally produced from a core for tennis balls obtained by blending a rubber composition, as obtained from natural or high cis-polybutadiene rubbers, with commonly used fillers such as clay, calcium carbonate, etc., and then vulcanizing the resulting blend.

Since a rigid tennis ball must meet the International Tennis Federation's standard (ITF standard), its weight, outside diameter, rebound height (hereinafter referred to as impact resilience) and deformation are limited. When pressurized type tennis balls are produced with rubber compositions obtained from natural or high cis-polybutadiene rubbers, the tennis ball has good impact resilience but is poor compression. Improvement of this defect by using large amounts of a vulcanizing agent such as sulfur, etc., brings about a reduction in the physical property of rubber, thus reducing the durability of the ball as well as increasing the change with time of the ball during playing as a result of which the ball may be punctured. Increasing the amount of filler in order to obtain a proper compression increases the weight of the ball so as to make it impossible to meet the ITF standard. Adding a filler having a strong reinforcing effect such as carbon, etc. undesirably reduces the impact resilience.

In order to develop rigidness, adding SBR or a high styrene resin to the rubber composition is contemplated, but this method undesirably reduces the impact resilience although a proper compression is obtained by adding small amounts of a filler.

SUMMARY OF THE INVENTION

An object of the present invention is to obtain a tennis ball and a core for the tennis ball which meets the ITF standard and has excellent durability.

That is, the present invention provides a core for a tennis ball obtained by vulcanizing a rubber composition containing, in its whole rubber component, 5 to 40 weight % of a 1,2-bond containing polybutadiene and 60 to 95 weight % of a natural rubber and/or high cis-polybutadiene containing not less than 90% of a cis 1,4-bond, and tennis balls obtained therefrom.

DETAILED EXPLANATION OF THE INVENTION

An object of the present invention is to provide tennis balls, particularly pressurized type ones, which meet the impact resilience and deformation standards specified by the ITF and have a high durability by employing a rubber composition of a particular blend to produce a core for a tennis ball.

The core for a tennis ball of the present invention is obtained by vulcanizing a rubber composition containing, in its whole rubber component, 5 to 40 weight % of a 1,2-bond containing polybutadiene and 60 to 95 weight % of a natural rubber and/or high cis-polybutadiene containing not less than 90% of a cis 1,4-bond.

The core for a tennis ball obtained from the foregoing rubber composition has a high toughness at break and high elongation at break as compared with cores obtained from the conventional high cis-polybutadiene. Also, tennis balls obtained from the present core have excellent durability.

The 1,2-bond containing polybutadiene of the present invention is a polybutadiene having, in the polymer, a 1,2-bond

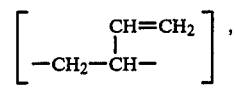

and the 1,2-bond is preferably a syndiotactic one. This 1,2-bond containing polybutadiene is preferably one containing 5 to 30% of a syndiotactic 1,2-bond and not less than 40% of a cis 1,4-bond.

When the content of the syndiotactic 1,2-bond in the 1,2-bond containing polybutadiene exceeds 30%, the impact resilience of the ball decreases. When the content is less than 5%, the ball becomes soft, and in order to obtain a proper compression, addition of a filler or resin such as SBR is required. This addition, however, causes a reduction in the impact resilience and gives a rigid feel when stroking.

When the content of the cis 1,4-bond in the 1,2-bond containing polybutadiene is less than 40%, impact resilience undesirably decreases.

The rubber composition used in the present invention contains the foregoing 1,2-bond containing polybutadiene in proportions of 5 to 40 weight % of the whole polymer. When the proportion exceeds 40 weight %, rigidness is felt, and the impact resilience is reduced. When the proportion is less than 5 weight %, softness appears to fail to obtain a proper compression.

It is preferred for the foregoing rubber composition to have a natural rubber or high cis-polybutadiene containing not less than 90% of a cis 1,4-bond or both in proportions of 60 to 95 weight % of the total polymer. These rubbers are those which are generally used for cores for tennis balls.

The rubber composition used in the present invention may contain other common fillers, such as zinc oxide, clay, calcium carbonate, magnesium carbonate, etc.

The core for a tennis ball of the present invention is obtained as follows: The foregoing polymers and fillers are kneaded together on a kneader such as Banbury mixer or a roll; after adding a vulcanizing agent and a vulcanization accelerator, kneading is continued and the rubber composition obtained is then formed into a sheet; the sheet is molded into a rod on an extruder, and the rod is then put in a half-shell mold and compression-molded into a semi-spherical shell body; and a proper gas-generating agent such as a mixture of an ammonium salt and a nitrite is put in the shell body, and another shell body is stuck thereto so as to form a sphere and compression-molded to obtain a core for a tennis ball.

This core is covered with a felt cover by the common method to obtain a pressurized type tennis ball.

With the core for a tennis ball of the present invention, the values of the physical properties of rubber, particularly T$_B$ (toughness at break) and E$_B$ (elongation at break) are high, the change with time by repeated strokes is small and the durability is excellent.

Tennis balls obtained from the core for a tennis ball of the present invention have the weight, deformation and impact resilience meeting the ITF standard as well as excellent durability and aging resistance.

The present invention will be illustrated in more detail with reference to the following examples.

EXAMPLES 1 to 4

The components described in Table 1 were kneaded together to prepare a rubber composition which was then vulcanized at 141° C. for 30 minutes. The physical property of the vulcanized rubber thus contained was measured according to the conditions specified by JIS (Japanese Industrial Standard) K-6301 and JIS A. The results are shown in Table 2.

These recipes in Table 1 were determined so that the pressurized type tennis ball showed a forward deformation of 6.0 to 6.5 mm when measured on the Steevens machine.

COMPARATIVE EXAMPLES 1 to 4

Using the recipes described in Table 1, the physical properties of rubber were measured in the same manner as in Examples 1 to 4. The results are shown in Table 2. These recipes also were determined so that the forward deformation was 6.0 to 6.5 mm.

TABLE 1

|  | Example | | | | Comparative example | | | |
|---|---|---|---|---|---|---|---|---|
|  | 1 | 2 | 3 | 4 | 1 | 2 | 3 | 4 |
| NR | 90 | 80 | 70 | 50 | 100 | 100 | 80 | 60 |
| Cis 1,4-polybutadiene (1) | — | — | — | 30 | — | — | — | 40 |
| 1,2-Bond containing polybutadiene (2) | 10 | 20 | 30 | 20 | — | — | — | — |
| Styrene/butadiene rubber (3) | — | — | — | — | — | — | 20 | — |
| Zinc oxide | 12 | 12 | 12 | 12 | 12 | 12 | 12 | 12 |
| White carbon | — | — | — | — | — | 10 | — | — |
| Hard clay | 20 | 20 | 20 | 20 | 20 | 10 | 20 | 20 |
| Magnesium carbonate | 40 | 40 | 40 | 40 | 40 | 40 | 40 | 40 |
| Stearic acid | 1 | 1 | 1 | 1 | 1 | 1 | 1 | 1 |
| Sulfur | 3.5 | 3.3 | 3.1 | 3.3 | 4.2 | 3.5 | 3.6 | 4.2 |
| Accelerator M (4) | 2.0 | 2.0 | 2.0 | 2.0 | 2.0 | 2.0 | 2.0 | 2.0 |
| Accelerator D (5) | 2.0 | 2.0 | 2.0 | 2.0 | 2.0 | 2.0 | 2.0 | 2.0 |

(1) BR11 (produced by Japan Synthetic Rubber Co.): Polybutadiene containing about 98% of a cis 1,4-bond.
(2) UBEPOL-VCR 412 (produced by Ube Industries, Ltd.): Polybutadien containing 12% of a syndiotactic 1,2-polybutadiene and 86% of a cis 1,4-bond.
(3) SBR #1502 (produced by Japanese Geon Co.)
(4) 2-Mercaptobenzothiazole
(5) Diphenylguanidine

TABLE 2

|  | 200% Modulus (kg/cm$^2$) | Tensile strength (kg/cm$^2$) | Elongation (%) | Hardness (JIS-A) |
|---|---|---|---|---|
| Example 1 | 97.6 | 145.0 | 320 | 74 |
| Example 2 | 98.2 | 144.2 | 310 | 75 |
| Example 3 | 98.5 | 144.0 | 300 | 76 |
| Example 4 | 98.0 | 144.4 | 315 | 75 |
| Comparative example 1 | 97.0 | 130 | 280 | 75 |
| Comparative example 2 | 97.5 | 137 | 270 | 76 |
| Comparative example 3 | 98.2 | 136 | 300 | 75 |
| Comparative example 4 | 97.6 | 131 | 270 | 75 |

EXAMPLES 1' to 4'

The components described in Table 1 were kneaded together on a kneader to prepare a rubber composition which was then formed into a sheet of 2.0 mm in thickness. The sheet was extrusion-molded into a rod on an extruder, and the rod was placed in a half-shell mold and compression/vulcanization-molded into a semi-spherical shell body (inside diameter, 53.8 mm; outside diameter, 60.5 mm). The semi-spherical shell body was then curved at 140° C. for 30 minutes. A gas generating agent (a mixture of an ammonium salt and a nitrite) was placed in the cured shell body, and another cured shell body was fitted thereto so as to form a sphere, and the whole was compression-molded while heating at 140° C. for 25 minutes to prepare a core for a tennis ball. The core thus obtained was covered with a felt cover to obtain a pressurized type tennis ball.

The tennis ball obtained was measured for the values of the ITF sttandard and a percent change with the lapse of time. The results are shown in Table 3. [In Example 1', the rubber composition was prepared using the same recipe as used in Example 1 (the same applies to other examples)].

TABLE 3

|  | Weight (g) | Forward deformation (mm) (6) | Return deformation (mm) (7) | Rebound (cm) (8) | The percent change with the lapse of time of forward compression by repeated strokes (%) (10) |
|---|---|---|---|---|---|
| Example 1' | 57.5 | 6.2 | 9.4 | 145 | 11.5 |
| Example 2' | 57.5 | 6.3 | 9.5 | 144 | 11.2 |
| Example 3' | 57.6 | 6.1 | 9.2 | 143 | 11.0 |
| Example 4' | 57.5 | 6.1 | 9.3 | 144 | 11.1 |
| Comparative example 1' | 57.6 | 6.3 | 9.5 | 145 | 13.5 |
| Comparative example 2' | 57.5 | 6.1 | 9.3 | 133 | — |
| Comparative example 3' | 57.4 | 6.0 | 9.1 | 135 | — |
| Comparative example 4' | 57.5 | 6.1 | 9.2 | 142 | 14.5 |
| ITF Stan- | 56.7–58.5 | 5.6–7.4 | 8.9–10.8 | 135–147 | — |

TABLE 3-continued

| | Weight (g) | Forward deformation (mm) (6) | Return deformation (mm) (7) | Rebound (cm) (8) | The percent change with the lapse of time of forward compression by repeated strokes (%) (10) |
|---|---|---|---|---|---|
| dard (9) | | | | | |

(6) Measured as follows by the Steevens machine: The ball is continuously compressed by about 2.54 cm each in the direction of the three diameters normal to one another, and this cycle is repeated three times (nine compressions in total); within 2 hours after this preliminary compression, an initial load of 3.5 pounds (1.575 kg) (first point) and then a load of 18 pounds (8.165 kg) (second point) are applied to the ball, and the valiable (mm) from the first point to the second one is read. The forwarddeformation is expressed by the valiable.
(7) After the valiable has been read in the above measurement of the forward deformation, the ball is further compressed to 2.54 cm by applying a load, the load is then reduced to 18 pounds (that is, the above second point is reached), and the valiable between the two points is again read. The return deformation is expressed by the valiable.
(8) The ball is dropped down to a concrete surface from a level of 254 cm, and restitution is measured.
(9) International Tennis Federation's standard.
(10) The ball is made to mechanically collide, at an initial velocity of 25 m/sec, against an iron plate at a distance of 50 cm. This operation is repreated 1500 times (this corresponds to a three-set match of top players).

As apparent from the results of Tables 1 to 3, a reduction in impact resilience is noticed in Comparative examples 2' and 3'. While, as apparent from examples 1' to 4', the tennis ball of the present invention is remarkably small in the change with time of the forward deformation by repeated strokes, showing that it has better durability and aging resistance than the conventional ones.

What is claimed is:

1. A core for a tennis ball obtained by vulcanizing a rubber composition containing, with respect to the entire rubber content of the core, 5 to 40 weight % of a polybutadiene which contains 5–30% of a syndiotactic 1,2-bond and not less than 40% of a cis 1,4-bond, and 60 to 95 weight % of a natural rubber and/or high cis-polybutadiene containing not less than 90% of a cis 1,4-bond.

2. A tennis ball comprising the core as recited in claim 1 and a cover.

3. A pressurized tennis ball comprising the core as recited in claim 1 and a cover.

* * * * *